(12) United States Patent
Sato

(10) Patent No.: US 8,029,619 B2
(45) Date of Patent: Oct. 4, 2011

(54) GROUTING MATERIAL

(75) Inventor: Takahiro Sato, Muroran (JP)

(73) Assignee: Nittetsu Cement Co., Ltd., Hokkaido (JP)

( * ) Notice: Subject to any disclaimer, the term of this patent is extended or adjusted under 35 U.S.C. 154(b) by 177 days.

(21) Appl. No.: 12/302,413

(22) PCT Filed: May 25, 2006

(86) PCT No.: PCT/JP2006/310473
§ 371 (c)(1),
(2), (4) Date: Nov. 25, 2008

(87) PCT Pub. No.: WO2007/138648
PCT Pub. Date: Dec. 6, 2007

(65) Prior Publication Data
US 2009/0188409 A1    Jul. 30, 2009

(51) Int. Cl.
*C09K 17/24* (2006.01)
*C09K 17/44* (2006.01)

(52) U.S. Cl. ........ 106/790; 106/695; 106/696; 106/778; 106/782; 106/789; 405/264; 405/266

(58) Field of Classification Search .................. 106/790, 106/695, 696, 778, 782, 789; 405/264, 266
See application file for complete search history.

(56) References Cited

U.S. PATENT DOCUMENTS 7,559,987 B2 * 7/2009 Sato et al. ............... 106/790

FOREIGN PATENT DOCUMENTS

| JP | 10-067548 A | 3/1998 |
|---|---|---|
| JP | 10-194814 A | 7/1998 |
| JP | 2002-047488 A | 2/2002 |
| JP | 2002-047489 A | 2/2002 |
| JP | 2002-097057 A | 4/2002 |
| JP | 2003-049164 A | 2/2003 |
| JP | 2003-171165 A | 6/2003 |

OTHER PUBLICATIONS

JP 2003049164 (Yoshida et al.) Feb. 21, 2003 abstract only.*
JP 2001233645 (Izumi et al.) Aug. 28, 2001; abstract only.*
JP 10259042 (Shinzaki et al.) Sep. 29, 1998 abstract only.*
JP 09255378 (Isoda et al.) Sep. 30, 1997 abstract only.*
JP 05208853 (Maejima et al.) Aug. 20, 1993 abstract only.*

* cited by examiner

*Primary Examiner* — Paul Marcantoni
(74) *Attorney, Agent, or Firm* — Sughrue Mion, PLLC

(57) ABSTRACT

A grouting material which contains a fine particle material having a Blaine specific surface area of 5000 $cm^2/g$ or more, containing 30 to 60% by mass of cement clinker, 40 to 70 % by mass of and blast-furnace slag and 0.5 to 3 parts by mass of gypsum in terms of $SO_3$ based on 100 parts by mass of the total amount of cement clinker and blast-furnace slag, and further contains (i) 4 to 8 parts by mass of calcium-aluminate-based rapid-hardening admixture, (ii) 0.05 to 0.2 parts by mass of setting retarder and (iii) 0.5 to 1.7 parts by mass of high-performance water-reducing agent, based on 100 parts by mass of the fine particle material.

7 Claims, No Drawings

GROUTING MATERIAL

TECHNICAL FIELD

The present invention relates to a composition of a cementitious grouting material used in construction field.

BACKGROUND ART

Construction methods using cementitious grouting materials are being employed not only for foundation treatment of dams, prevention of ground liquefaction, and reinforcement of rock and ground in tunnel excavation, but also as a filling material for fixing anchor bolts, recently.

As cementitious grouting materials, for making the grouting more effective, fine particles grouting materials having a Blaine specific surface area of 5000 $cm^2/g$ or more obtained by pulverizing and classifying a mixture consisting of blast-furnace slag mainly and Portland cement are used, and there are many examples using such materials.

Fine particle grouting materials having a fine particle size has high hydration activity. Since the viscosity of the grouting material slurry increases due to hydration, expected grouting effects often fail to be exhibited. Also, to ensure the filling effect, it is necessary to maintain a low viscous state for a long period of time. For this reason, high-level dispersion of particles and inhibition of hydration are required. As such dispersion, a high-performance water-reducing agent is widely used (e.g., see Laid-Open Japanese patent publication No. 2003-49164; Patent Document 1).

Fine particle grouting material develops strength equivalent to that of Portland cement. However, due to the use of the high-performance water-reducing agent, the gelation and hardening after injection may be retarded and take 10 to 20 hours in some cases.

The grouting material slurry of injected grout may fail to obtain sufficient effects of the grouting material in a case either where it receives an external force before gelation or hardening or where it contacts with confined water or running water to be removed and washed away from the injected area. And also if hardening of the grouting material is markedly delayed, the whole construction process including the step next to grouting is disturbed, which may lead to economical disadvantages.

On the other hand, as a grouting for limited area, a grouting material composition to which gel time is imparted using a specific rapid-hardening admixture, inorganic sulfuric acid salt and liquid glass is devised for the purpose of shortening the setting time (Laid-open Japanese patent publication No. 2004-231884; Patent Document 2). Such a grouting material has, however, problems that development of strength is insufficient and that a low viscous state cannot be maintained due to high hydration rate.

[Patent Document 1] Laid-open Japanese patent publication No. 2003-49164

[Patent Document 2] Laid-open Japanese patent publication No. 2004-231884

DISCLOSURE OF INVENTION

Problems to be Solved by Invention

Under these circumstances, as fine particle grouting material which can satisfy needs of shortening construction work periods with high injectability, there is a demand for properties capable of maintaining a low viscous state over a prolonged period of time, controlling gel time in one-component and exhibiting an excellent strength development in short time.

Means for Solving Problems

As a result of extensive studies, the present inventors have found out that a grout slurry which has a high injectability, is capable of controlling gel time while keeping a low viscous state and achieves an excellent short-term strength, can be obtained by using a rapid-hardening admixture, a setting retarder and a high-performance water-reducing agent in combination with a fine particle grouting material having specific material composition, blending ratio and a Blaine specific surface area. They have completed the present invention based on this finding. That is, the present invention provides a grouting material having a constitution as follows:

[1] A grouting material which comprises a fine particle material having a Blaine specific surface area of 5000 $cm^2/g$ or more containing
  30 to 60% by mass of cement clinker,
  40 to 70% by mass of and blast-furnace slag and
  0.5 to 3 parts by mass of gypsum in terms of $SO_3$ based on 100 parts by mass of the total amount of cement clinker and blast-furnace slag,
and further comprises
  (i) 4 to 8 parts by mass of calcium-aluminate-based rapid-hardening admixture,
  (ii) 0.05 to 0.2 parts by mass of setting retarder and
  (iii) 0.5 to 1.7 parts by mass of high-performance water-reducing agent, based on 100 parts by mass of the fine particle material.

[2] The grouting material according to 1, wherein the (i) calcium-aluminate-based rapid-hardening admixture contains $12CaO \cdot 7Al_2O_3$.

[3] The grouting material according to 2, wherein the (i) calcium-aluminate-based rapid-hardening admixture further contains anhydrite.

[4] The grouting material according to any one of 1 to 3, wherein the (ii) setting retarder is oxycarboxylic acid or a salt thereof.

[5] The grouting material according to any one of 1 to 3, wherein the (iii) high performance water reducing agent is a melamine sulfonic acid-based condensation product.

[6] The grouting material according to 1, wherein the (i) calcium-aluminate-based rapid-hardening admixture contains $12CaO \cdot 7Al_2O_3$ and anhydrite, the (ii) setting retarder is sodium gluconate and the (iii) high performance water-reducing agent is a melamine sulfonic acid-based condensation product.

EFFECT OF INVENTION

The ultrafine particle grouting material of the present invention can maintain a low viscous state for a long period of time, control the gel time and develops a short-term strength rapidly. The grouting material of the present invention enables forced feed over a long distance, and then contributes to significant enhancement in injection efficiency and to shortening the work period, as compared with grouting effects obtained by using conventional fine particle grouting material.

BEST MODE FOR CARRYING OUT INVENTION

The fine particle material used in the present invention comprises cement clinker, blast-furnace slag and gypsum.

As the cement clinker, a Portland cement clinker according to JIS R5210 may be used. Examples thereof include high-early-strength Portland cement clinker, normal Portland cement clinker, moderate-heat Portland cement clinker, low-heat Portland cement clinker and sulfate resisting Portland cement clinker. Among these, in consideration for injectability and ease of controlling gel time, normal Portland cement clinker is preferred.

As the blast-furnace slag, a rapid-quenched blast-furnace slag according to JIS A6206 may be used. In consideration for strength of the grouting material, blast-furnace slags having a glass content of 90% or more and a basicity of 1.6 or more are preferred.

The blending ratio of the cement clinker and the blast-furnace slag is from 30 to 60% by mass (cement clinker): from 70 to 40% by mass (blast-furnace slag), preferably from 40 to 55% by mass (cement clinker): from 60 to 45% by mass (blast-furnace slag). If the amount of the cement clinker is less than 30% by mass (i.e., the amount of the blast-furnace slag exceeds 70% by mass), hydration becomes weak, setting does not occur and strength cannot be exhibited as desired. If the amount of the cement clinker exceeds 60% by mass (i.e., the amount of the blast-furnace slag is less than 40% by mass), hydration cannot be controlled and it becomes difficult for the material to maintain a low viscosity.

Gypsum is blended in for the purpose of controlling hydration of the cement clinker and promoting hydration of the blast-furnace slag. As the gypsum, anhydrite or calcium sulfate dihydrate may be used. The blending amount is in a range of 0.5 to 3 parts by mass, preferably 1.2 to 2.5 parts by mass in terms of $SO_3$, based on the total 100 parts by mass of the cement clinker and the blast-furnace slag. If the amount in terms of $SO_3$ is less than 0.5 parts by mass, hydration control of the cement clinker becomes insufficient and if the amount exceeds 3 parts by mass, hydration of the blast-furnace slag is highly promoted, which makes it difficult to maintain the viscosity within a certain range.

The fine particle material used in the present invention has a Blaine specific surface area of 5000 cm$^2$/g or more, preferably, 6000 cm$^2$/g or more. By having a Blaine specific surface area of 5000 cm$^2$/g or more, the sedimentation rate in the grout milk is lowered and injectability can be improved. The Blaine specific surface area is preferably 8000 cm$^2$/g or less, more preferably, 7000 cm$^2$/g or less. If the fine particle material has a larger Blaine specific area, it would increase the preparation cost of the material.

In the present invention, specific amounts of calcium-aluminate-based rapid-hardening admixture, setting retarder and high-performance water-reducing agent are blended into the above-mentioned fine particle material.

Examples of the calcium-aluminate-based rapid-hardening admixture used in the present invention include calcium aluminates such as $CaO.Al_2O_3$, $CaO.2Al_2O_3$, $3CaO.Al_2O_3$, and $12CaO.7Al_2O_3$, $11CaO.7Al_2O_3.CaF_2$ in which one CaO of $12CaO.7Al_2O_3$ is substituted by a halide such as $CaF_2$, calcium aluminosilicate in which $SiO_2$ accounts for a large part of the composition, and those containing a $SO_3$ component. These calcium aluminates may be crystalline or amorphous. In consideration for injectability and development of strength, amorphous material is preferred.

Moreover, in consideration for further improvement in short- and long-term strength, a mixture of calcium aluminate and gypsum may be used. In a case where gypsum is blended into the admixture, the blending amount of gypsum is in a range of 0.5 to 1.5 parts by mass based on 1 part by mass of calcium aluminate, preferably the amount is equivalent to the amount of calcium aluminate. By adding gypsum, development of strength can be excellent.

Preferred examples of the calcium-aluminate-based rapid-hardening admixture used in the present invention include $12CaO.7Al_2O_3$ and a mixture of $12CaO.7Al_2O_3$ and anhydrite.

It is preferable that the calcium-aluminate-based rapid-hardening admixture used in the present invention have a Blaine specific surface area of 5000 cm$^2$/g or more in terms of fineness. Use of such an admixture having a Blaine specific surface area of 5000 cm$^2$/g or more enables to obtain a grouting material having excellent injectability, which can control gel time and develop a good short-term strength.

The calcium-aluminate-based rapid-hardening admixture may be independently ground to be adjusted to have the above-described fineness. The admixture may be mixed with a fine particle material or other additives and then ground. Also, it may be mixed with a Portland cement clinker or a blast-furnace slag and then be subjected to grinding.

In a case where a slurry is prepared by mixing a fine particle material with a calcium-aluminate-based rapid-hardening admixture, calcium aluminate is rapidly dissolved in the slurry to react with gypsum component to thereby form ettringite and monosulfate and at the same time generate free aluminum hydroxide. Moreover, calcium aluminate promotes hydration of alite which is a mineral of a Portland cement clinker mineral contained in the ultrafine particle grouting material, to thereby serve as a setting accelerator in the synergy with formation of ettringite. On the other hand, aluminum hydroxide is generated on surface of blast-furnace slag particles, and it promotes hydration of blast-furnace slag, and contributes to development of short-term strength.

The blending amount of the rapid-hardening admixture is in a range of 4 to 8 parts by mass, preferably 4.5 to 7.5 parts by mass, based on 100 parts by mass of the fine particle material. Although this addition amount is much smaller than the amount used in concrete or mortar material, the aimed target can be achieved. If the amount is less than 4 parts by mass, gelation is retarded and the desired short-term strength can not be developed. If the amount exceeds 8 parts by mass, hydration activity is increased and viscosity of the slurry increases, which deteriorates injectability.

Examples of the setting retarder used in the present invention include oxycarboxylic acids such as gluconic acid, citric acid, tartaric acid and malic acid, and salts thereof. Preferred salts are alkali metal salts such as sodium salt and potassium salt. A preferred setting retarder is an alkali metal salt of gluconic acid, more preferred is sodium gluconate. Sodium gluconate can efficiently retard hydration of calcium aluminate and control formation time of ettringite which causes increase in viscosity so that a low viscosity can be maintained. Also, in the synergetic effect with high-performance water-reducing agent, high dispersion of the slurry can be maintained.

The blending amount of the setting retarder is in a range of 0.05 to 0.2 parts by mass, preferably 0.08 to 0.18 parts by mass, based on 100 parts by mass of the fine particle material. If the amount is less than 0.05 parts by mass, the effect of retarding hydration of the rapid-hardening admixture cannot be expected and viscosity increases at an early stage. If the amount exceeds 0.2 parts by mass, a low viscous state can be maintained but gelation is not caused, which results in difficulty in development of a short-term strength.

Examples of the high-performance water-reducing agent used in the present invention include high condensation products of naphthalenesulfonic acids, melamine sulfonic acid condensation products, polycarboxylic acid-based agents and polyether-based agents, which do not contain a composition of setting retardation. Preferred are melamine sulfonic acid condensation products which can especially improve dispersibility in the composition of the present invention. Adding a high-performance water-reducing agent into the material enables to obtain a grouting material which is able to exhibit a short-term strength while maintaining a low viscous state.

The blending amount of the high-performance water-reducing agent is in a range of 0.5 to 1.7 parts by mass, preferably 0.5 to 1.5 parts by mass, based on 100 parts by mass of the fine particle material. If the amount of the high-performance water-reducing agent is less than 0.5 parts by mass, dispersion of the grouting material particles in the slurry becomes insufficient, which leads to failure to obtain viscosity as desired. Even if the blending amount exceeds 1.7 parts by mass, no further decrease in viscosity can be obtained, and exhibition of the short-term strength is also delayed.

The grouting material of the present invention can be produced by conventional methods. For example, a method in which components having a fineness adjusted by grinding treatment when necessary are mixed with each other, a method in which one or more components are mixed together and then subjected to grinding treatment when necessary, and subsequently other components are added thereto and a method in which all components are mixed together and then the mixture is subjected to grinding treatment to adjust the fineness or the like may be employed.

The grouting material of the present invention is used in form of aqueous slurry. A preferred amount of water to be added is in a range of 50 to 600 parts by mass, based on 100 parts by mass as the total amount of the fine particle material and the calcium-aluminate-based rapid-hardening admixture. There is no particular limitation on the method for preparing the slurry. For example, the slurry is prepared by placing the grouting material of the present invention and water into a grout mixer or the like and mixing them together while stirring.

EXAMPLES

Hereinafter, the invention is described in greater detail by referring to Examples and Comparative Examples. The scope of the invention is not limited to these Examples.

The composition and fineness of the fine particle materials used in Examples and Comparative Examples (manufactured by NITTETSU CEMENT CO., LTD.) are shown in Table 1.

[Table 1]

TABLE 1

| Normal Portland cement clinker (Parts by mass) | Blast-furnace slag (Parts by mass) | Gypsum (Parts by mass in terms of $SO_3$) | Blaine specific surface area ($cm^2/g$) |
|---|---|---|---|
| 45 | 55 | 2.0 | 6400 |

The normal Portland cement clinker used here was manufactured by NITTETSU CEMENT CO., LTD., the blast-furnace slag was manufactured by NIPPON STEEL CORPORATION, with a glass content of 99%, and as the gypsum, natural anhydrite was used.

As for each of the additives, the following materials were used.
(A) Calcium-Aluminate-Based Rapid-Hardening Admixture
Biform (product name); manufactured by DENKI KAGAKU KOGYO KABUSHIKI KAISHA, Blaine specific surface area: 5600 $cm^2/g$ (B) Setting Retarder
Sodium gluconate (manufactured by Astellas Pharma Inc.)
(C) High-Performance Water-Reducing Agent
Sikament FF86 (product name); manufactured by Sika Ltd. Japan
(Comparative Materials)
High-performance water-reducing agent: Mighty 150R (product name); manufactured by Kao Corporation
Setting retarder: Sodium carbonate (Soda Ash (product name); manufactured by Central Glass Co., Ltd.)

Examples 1-8

Comparative Examples 1-9

By using the above materials, slurries each having a water content of 55% (water/fine particle material+rapid-hardening admixture) were prepared according to the blending conditions shown in Table 2. The viscosity, gel time and short-term strength were measured and comprehensive evaluation of each grouting material was made. The results are shown in Table 3.

The method for each evaluation is described below.
(1) Viscosity
After stirring 600 ml of slurry with an electric mixer for 3 minutes, the viscosity of the slurry was measured using a Type B viscometer (Viscometer TV-20; manufactured by Tokimec Inc.) according to JIS K7117-1. The measurement was performed at 60 rpm using Spindle No. 1. This evaluation was made at the initial stage and the later stages of slurry. As for the measurement of the later stages, the values 30 minutes and 60 minutes after preparation of the slurry under the same conditions were measured.
(2) Gel Time
After stirring 500 ml of slurry with an electric mixer for 3 minutes, the slurry was kept being stirred with a stirrer. By visually confirming the stoppage of the slurry flow, the time taken until the slurry came to a stop was measured.
(3) Short-term Strength
After stirring 2000 ml of slurry with an electric mixer for 3 minutes, the slurry was molded in a mold of $\phi 5 \times 10$ cm, and the short-term strength was evaluated at each material age of six hours and seven days according to compressive strength test described in JIS A1108. The material was cured at a temperature of $20 \pm 1°$ C. until each of the material ages.
(4) Properties of Grouting Material (Comprehensive Evaluation)
Comprehensive evaluation was made on the three properties of viscosity, gel time and short-term strength.

[Table 2]

TABLE 2

| | Rapid-hardening admixture (A) | Setting retarder (B) | High-Performance water-reducing agent (C) | Mighty 150 R | Sodium carbonate |
|---|---|---|---|---|---|
| Example 1 | 5.0 | 0.10 | 1.0 | | |
| Example 2 | 7.0 | 0.10 | 1.0 | | |
| Example 3 | 7.0 | 0.15 | 1.0 | | |
| Example 4 | 7.0 | 0.10 | 0.6 | | |
| Example 5 | 7.0 | 0.10 | 1.2 | | |
| Comparative Example 1 | 3.0 | 0.10 | 1.0 | | |
| Comparative Example 2 | 9.0 | 0.10 | 1.0 | | |

TABLE 2-continued

|  | Rapid-hardening admixture (A) | Setting retarder (B) | High-Performance water-reducing agent (C) | Mighty 150 R | Sodium carbonate |
|---|---|---|---|---|---|
| Comparative Example 3 | 7.0 | 0.00 | 1.0 | | |
| Comparative Example 4 | 7.0 | 0.30 | 1.0 | | |
| Comparative Example 5 | 7.0 | 0.10 | 0.4 | | |
| Comparative Example 6 | 7.0 | 0.10 | 1.8 | | |
| Comparative Example 7 | 7.0 | | | 1.0 | |
| Comparative Example 8 | | | 1.0 | | 2.0 |
| Comparative Example 9 | | | | | |

(Each of the values shows parts by mass based on 100 parts by mass of the total of cement clinker and blast-furnace slag.)

[Table 3]

TABLE 3

|  | Viscosity (mPa · s) | | | Gel time (min.) | Compressive strength (N/mm$^2$) | | Comprehensive Evaluation | | | |
|---|---|---|---|---|---|---|---|---|---|---|
|  | Immediate after stirring | 30 Minutes later | 60 Minutes later | Start | 6 hours | 7 days | Viscosity | Gel time | Development of strength | Overall rating |
| Ex. 1 | 26 | 26 | 28 | 170 | 0.3 | 39.2 | ○ | ○ | ○ | ◎ |
| Ex. 2 | 29 | 29 | 52 | 70 | 1.2 | 39.0 | ○ | ○ | ○ | ◎ |
| Ex. 3 | 28 | 28 | 32 | 173 | 0.5 | 37.4 | ○ | ○ | ○ | ◎ |
| Ex. 4 | 48 | 53 | 87 | 71 | 1.4 | 37.6 | ○ | ○ | ○ | ◎ |
| Ex. 5 | 22 | 22 | 26 | 100 | 0.9 | 38.8 | ○ | ○ | ○ | ◎ |
| Comp. Ex. 1 | 24 | 24 | 25 | —*1 | —*2 | 38.3 | ○ | X | X | X |
| Comp. Ex. 2 | 30 | 34 | >100 | 53 | 2.5 | 35.7 | X | X | ○ | X |
| Comp. Ex. 3 | 33 | >100 | >100 | 10 | 2.0 | 38.1 | X | X | ○ | X |
| Comp. Ex. 4 | 25 | 25 | 25 | —*1 | —*2 | 38.1 | ○ | X | X | X |
| Comp. Ex. 5 | 60 | 72 | >100 | 56 | 2.0 | 35.5 | X | X | ○ | X |
| Comp. Ex. 6 | 20 | 20 | 21 | 145 | —*2 | 37.6 | ○ | ○ | X | X |
| Comp. Ex. 7 | 27 | 27 | 27 | —*1 | —*2 | 36.3 | ○ | X | X | X |
| Comp. Ex. 8 | 42 | 60 | >100 | —*1 | 0.2 | 40.0 | X | X | ○ | X |
| Comp. Ex. 9 | >100 | >100 | >100 | —*1 | —*2 | 37.2 | X | X | X | X |

*1: A gel state was not confirmed.
*2: Not removable from the mold (after six hours)
Evaluation
Viscosity:
○ Less than 100 mPa · s at 60 minutes after stirring
X 100 mPa · s or more at 60 minutes after stirring
Gel time:
○ 60 minutes or more and less than 240 minutes
X Less than 60 minutes or 240 minutes or more
Development of strength:
○ Strength of 0.1 N/mm$^2$ or more at six hours
X Strength of less than 0.1 N/mm$^2$ at six hours
Overall rating:
◎ Rated-○ in all of viscosity, gel time and strength
X Rated-X in any one of viscosity, gel time and strength In Comparative Example 1 where only 3 parts by mass of the rapid-hardening admixture was blended, although the viscosity was satisfactory, the gelation failed to occur and development of strength was insufficient. On the other hand, in Comparative Example 2 where 9 parts by mass of the rapid-hardening admixture was blended, although the development of strength was good, the grouting material was not be able to maintain the viscosity, which resulted in a short gel time.

In Comparative Example 3 where no setting retarder was used, the material was unable to maintain the viscosity from an early stage, which resulted in an extremely short gel time of ten minutes. In Comparative Example 4 where 0.3 parts by mass of setting retardant was blended, the gelation failed to occur and the development of strength was insufficient.

In comparative Example 5 where only 0.4 parts by mass of high-performance water-reducing agent was blended, viscosity of the slurry was so high from an early stage and exceeded 100 mpa·s 60 minutes after the preparation of the slurry. In comparative Example 6 where 1.8 parts by mass of high-performance water-reducing agent was blended, the slurry failed to attain sufficient development of strength.

In Comparative Example 7 where high-performance water-reducing agent having setting retarder blended therein (mighty 150R) was used, the development of strength was insufficient and adsorption of the high-performance water-reducing agent and influence of the setting retarder contained in the high-performance water-reducing agent were markedly observed.

In Comparative Example 8 where sodium carbonate was blended, although sufficient development of strength was attained, the viscosity exceeded 100 mpa·s in 60 minutes and gelation failed to occur. In this case, though hydration was accelerated in a relatively short time of the 60 minutes, the material resulted in curing without the gelation process.

In Comparative Example 9 where no admixture or agents were added, viscosity of the slurry was higher than that of Comparative Example 5, and the viscosity exceeded 100 mpa·s immediately after kneading.

Based on the comprehensive evaluation, the grouting materials of Comparative Examples 1 to 9 failed to achieve one or more of desired viscosity, gel time and development of short-term strength.

On the other hand, the grouting materials of Examples 1 to 5 had low viscosity at an initial stage and maintained low viscosity for 60 minutes. Also, attaining gel time from 70 to 173 minutes and short-term strength from 0.3 to 1.4 N/mm$^2$, the materials enabled to control the gel time and short-term strength development.

Based on the comprehensive evaluation, the grouting materials of Examples 1 to 5 succeeded in achieving desired viscosity, gel time and development of short-term strength. This shows that good grouting materials are provided in Examples 1 to 5.

The invention claimed is:

1. A grouting material which comprises
a fine particle material having a Blaine specific surface area of 5000 cm$^2$/g or more containing
greater than 40% by mass and 60% by mass or less of cement clinker,
40% by mass or more and less than 60% by mass of blast-furnace slag and
0.5 to 3 parts by mass of gypsum in terms of SO$_3$ based on 100 parts by mass of the total amount of cement clinker and blast-furnace slag,
and further comprises
(i) 4 to 8 parts by mass of calcium-aluminate-containing rapid-hardening admixture,
(ii) 0.05 to 0.2 parts by mass of setting retarder and
(iii) 0.5 to 1.7 parts by mass of high-performance water-reducing agent, based on 100 parts by mass of the fine particle material.

2. The grouting material according to claim 1, wherein the (i) calcium-aluminate-containing rapid-hardening admixture contains 12CaO.7Al$_2$O$_3$.

3. The grouting material according to claim 2, wherein the (i) calcium-aluminate-containing rapid-hardening admixture further contains anhydrite.

4. The grouting material according to claim 1, wherein the (ii) setting retarder is oxycarboxylic acid or a salt thereof.

5. The grouting material according to claim 1, wherein the (iii) high performance water reducing agent is a melamine sulfonic acid condensation product.

6. The grouting material according to claim 1, wherein the (i) calcium-aluminate-containing rapid-hardening admixture contains 12CaO.7Al$_2$O$_3$ and anhydrite, the (ii) setting retarder is sodium gluconate and the (iii) high performance water-reducing agent is a melamine sulfonic acid condensation product.

7. The grouting material according to claim 1, wherein the fine particle material contains greater than 40% by mass and 55% by mass or less of cement clinker.

* * * * *